United States Patent [19]

Hoyler

[11] 4,251,899
[45] Feb. 24, 1981

[54] WIPER ARM OF AN ARRANGEMENT FOR WIPING A VEHICLE WINDOW

[75] Inventor: Alfred Hoyler, Bühlertal, Fed. Rep. of Germany

[73] Assignee: Robert Bosch GmbH, Stuttgart, Fed. Rep. of Germany

[21] Appl. No.: 98,141

[22] Filed: Nov. 21, 1979

[30] Foreign Application Priority Data

Dec. 14, 1978 [DE] Fed. Rep. of Germany ....... 2853948

[51] Int. Cl.³ .............................................. B60S 1/32
[52] U.S. Cl. .................................. 15/250.35; 403/374
[58] Field of Search ........... 15/250.20, 250.35–250.42; 403/374, 377, 330, 409

[56] References Cited

U.S. PATENT DOCUMENTS

| | | | |
|---|---|---|---|
| 2,528,258 | 10/1950 | Zaiger | 15/250.35 |
| 3,006,015 | 10/1961 | Zury | 15/250.35 |
| 3,042,955 | 7/1962 | Oishei | 15/250.35 |
| 3,366,989 | 2/1968 | Ludwig | 15/250.2 |
| 3,939,525 | 2/1976 | Stratton | 15/250.35 |

Primary Examiner—Peter Feldman
Attorney, Agent, or Firm—Michael J. Striker

[57] ABSTRACT

A wiper arm for transmitting moment from drive to a wiping element for wiping a vehicle window has a hub member connected with a drive, a U-shaped body member pivotally connected with the hub member and having two lugs connected with one another by a web so as to form a space closed at its three sides, a wiper rod accommodated in this space of the body member and arranged to support the wiping element and to move in direction of elongation of the body member, a structural member accommodated in the space of the body member and connectable with the wiper rod, a prestressed spring member accommodated in the space of the body member and mounted on the hub member and the structural member so as to urge the wiper rod, and a cover member which is arranged pivotally relative to the body member so as to pivot to a closed position in which the cover member closes the space of the body member at its fourth side and arrests the wiper rod.

16 Claims, 6 Drawing Figures

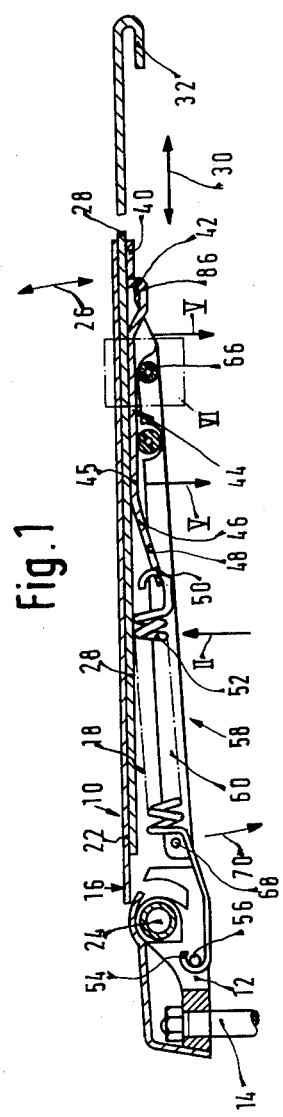

WIPER ARM OF AN ARRANGEMENT FOR WIPING A VEHICLE WINDOW

BACKGROUND OF THE INVENTION

The present invention relates to a wiper arm of an arrangement for wiping a vehicle window. More particularly, it relates to a wiper arm for transmission movement from drive means to a wiping element for cleaning a vehicle window. Wiper arms of wiping arrangements of the above-mentioned general type are known in the art. A known wiper arm has a cover which is secured to a structural member for holding a tension spring in longitudinal direction and is undetachably connected with the same by bent tongues of an arm body member. In order to arrest a wiper rod, the cover is provided with an adjusting screw which is screwed against the wiper rod and requires a tool for its adjustment. A safety screw is further required which prevents unintentional loss of the adjustment screw and thereby prevents unintentional changes of the length of the wiper arm. The cover must also have such a thickness in the region of the threaded bore for the adjustment screw that the pressure force of the screw will be taken up from the cover without damaging the thread of a nut.

SUMMARY OF THE INVENTION

Accordingly, it is an object of the present invention to provide a wiper arm of an arrangement for wiping a vehicle window, which avoids the disadvantages of the prior art.

More particularly, it is an object of the present invention to provide a wiper arm of an arrangement for wiping a vehicle window, in which arresting of a wiper rod can be released by turning of a cover from its closing position, and after adjustment of the length of the wiper arm the cover can be bent back to its closing position by merely turning the same, without utilization of special auxiliary means.

In keeping with these objects and with others which will become apparent hereinafter, one feature of the present invention resides, briefly stated, in a wiper arm which has a hub member connectable with a drive means, a U-shaped elongated arm body member pivotally connected with the hub member and having two legs connected with one another by a web so as to form a space closed at its three sides, a wiper rod accommodated in the space of the body member and arranged to support a wiping element and to move in direction of elongation of the body member, a structural member accommodated in the space and connectable with the wiper rod, a prestressed spring member accommodated in the space and mounted on the hub member and the structural member so as to urge the wiper rod, wherein a cover member is provided which is arranged pivotally relative to the body member so as to pivot to a closed position in which the cover member closes the space at its fourth side and arrests the wiper rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a view showing a longitudinal section of a wiper arm in accordance with the invention;

FIG. 2 is a plan view of the wiper arm in direction of the arrow II in FIG. 1;

FIG. 3 is a view showing the wiper arm in accordance with FIG. 2 with a removed cover;

DESCRIPTION OF PREFERRED EMBODIMENTS

Figure 4:
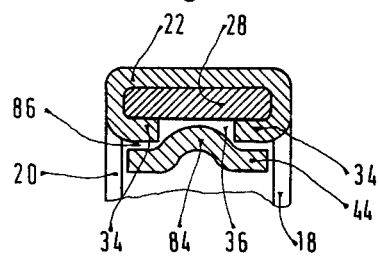
FIG. 4 is an enlarged view showing a section of the wiper arm taken along line IV—IV in FIG. 3.

A wiper arm is identified in the drawing by reference numeral 10 and is provided with a hub member 12 releasably connected in known manner with a wiper shaft 14 which serves as a drive means. The wiper arm 10 has as body member 16 of a U-shaped cross section including two legs 18 and 20 connected by a web 22.

The body member 16 is connected with the hub member 12 by a hinge 24 and is movable relative to the same in direction of the double arrow 26 shown in FIG. 1. A wiper rod 28 extends in a space which is closed at three sides by the legs 18 and 20 and the web 22. The wiper rod 28 lies on the inner surface of the web 22 and is movable in direction of the double arrow 30 shown in FIG. 1. One end of the wiper rod 28 extends outwardly beyond the body member 16 and is provided with a hook 32 for connecting with a not shown wiping element.

The wiper body member 16 in the region of its free end has bent tongues formed as extensions of the legs 18 and 20. The tongues 34 surround the wiper rod 28 so that a guide passage 36 for the latter is provided. The tongues 34 have two recesses 38 and 40 located one after the other in the direction of elongation of the wiper arm 10. A claw 42 of a longitudinally extending structural member 44 can be selectively hooked in the recesses 38 and 40. The structural member 44 extends from its claw 42 in direction towards the hub member 12 and rests by its flat portion 45 on the wiper rod 28 and more particularly at its side which is opposite to the web 22 of the body member 16. An end portion 46 of the structural member 44, which is spaced from the claw 42, is bent away from the wiper rod 28 and provided with a cutout 48.

A hook 50 of a tension spring 52 is hooked into the cutout 48. The other end of the tension spring 52 also has a hook 54 which is hooked on a pin 56 of the hub member 12. The tension spring 52 in the shown embodiment is somewhat prestressed so that the body member 16 is pulled in clockwise direction (double arrow 26) about the hinge 24. The tension spring 52 ensures contact pressure with which the not shown wiping element abuts against a window to be wiped. The claw 42 located in one of the recesses 38 or 40 provides for anchoring of the tension spring 52 in the body member 16. Thereby, the structural member 44 also serves as a spring anchoring member.

A cover 58 is arranged on the body member 16 at its side opposite to the web 22. The cover 58 has a U-shaped cross section and is so formed that its legs 60 and 62 extend between the legs 18 and 20 of the body member 16. A web 64 connecting the legs 60 and 62 of the cover 58 is arranged in the region of the free ends of the legs 18 and 20 and closes at the fourth side the space which is bounded at the three sides by the legs 18 and 20 and the web 22 of the body member 16. The cover 58 is connected with the body member 16 by a hinge pin 66, and can be seen particularly from FIGS. 5 and 6.

The hinge pin 66 extends through the legs 18 and 20 of the U-shaped body member 16 as well as through the legs 60 and 62 of the U-shaped cover 58.

The cover 58 extends from the hinge pin 66 outwardly toward the region located in the vicinity of the hub member 12 of the wiper arm 10. In the region of the free end of the cover 58, the legs 18 and 20 of the U-shaped body member 16 are provided with inwardly extending lugs 68. The lugs 68 are received in not-shown depressions on the outer side of the legs 60 and 62 of the U-shaped cover 58 when the cover 58 is moved into its closing position against the arrow 70 of FIG. 1. The lugs 68 together with the depressions form a releasable arresting connection by which the cover 58 is secured in its closing position.

Figure 6:
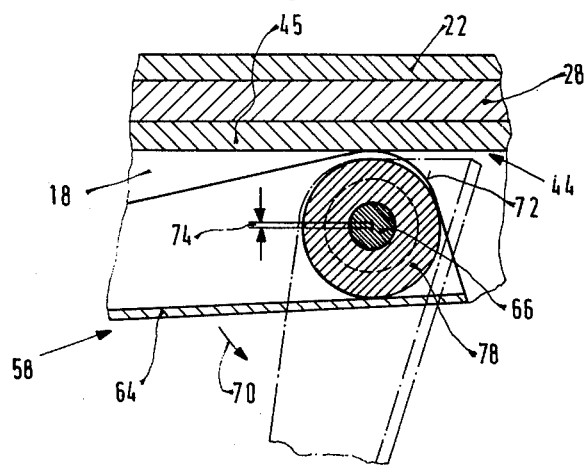
FIG. 6 is an enlarged view of a unit which is identified by reference number 6 in FIG. 1.

The legs 60 and 62 of the U-shaped cover 58 has, in the region of the hinge pin 66, rounded sections provided at their edges, as shown in FIG. 6. The rounded sections 72 are eccentrically arranged relative to the hinge pin 66 by a distance 74. The eccentricity of the rounded sections 72 is so selected that in the closing position of the cover 58 shown in FIG. 6 the rounded sections 72 exert clamping action onto a portion 45 of the structural member 44 and thereby also exert clamping action upon the wiper rod 28, because of the support of the hinge pin 66 in the legs 18 and 20 of the arm member 16. When the cover 58 is turned into its opening position shown in dotted lines in FIG. 6, the clamping eccentric formed by the rounded sections 73 releases both the structural member 34 and the rod 28, so that the wiper rod 28 can be displaced in direction of the double arrow 30. In order to arrest the wiper rod 28, the cover 58 must be brought in its closing position. For this purpose, it is turned against the arrow 70 and arrested by its lugs 68 in the legs 18 and 20 of the body member 16.

When the clamping eccentric formed by the rounded sections 72 is released, the claw 42 of the structural member 44 can be withdrawn from the recess 38 and brought into the recess 40. This change is performed when the contact pressure of the wiping element upon the window to be cleaned, acting in clockwise direction of the double arrow 26, must be increased. By transmission of the claw 42 into the recess 40, the tension spring 52 is prestressed stronger as compared with the position of the claw 42 in the recess 38. It is of course understood that in order to adjust the prestress of the wiper arm 10, more than two recesses for the claw 42 may be provided.

Figure 5:
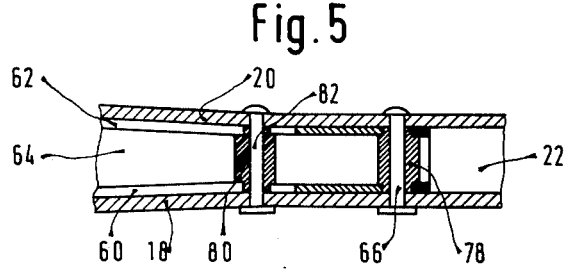
FIG. 5 is an enlarged view showing a section of the wiper arm taken along line V—V in FIG. 1.

In order to facilitate displacement of the structural member 44, the hinge pin 66 is provided with a rotatable sleeve 78. The guidance of the structural member 34 is improved when a second rotatable sleeve 80 is provided between the hinge pin 66 and the cutout 48 for hanging the tension spring 52. The sleeve 80 shown in FIG. 5 is supported by an axle 82 mounted in the legs 18 and 20 of the body member 16. The arrangement and setting of the guiding sleeves 78 and 80 is so selected that the structural member 44 rests on the sleeve when the clamping eccentric 72 is released.

The spring anchoring structural member 44 is provided with a rib 84 in the region of the claw 42 for reinforcing purposes, as shown in FIG. 4. When the clamping eccentric 74 is released, the claw 42 can be withdrawn without difficulties from its recess 38 or 40. For this purpose, a tool is engaged into a gap between the structural member and the bent tongues 44 and the claw is lifted from the recess. The clamping eccentric 72 presses against the structural member fixed in its position for the claw 42, against the wiper rod 28. For this reason, when the clamping eccentric 72 is clamped or tightened, no displacement of the wiper rod 28 takes place. The selected wiper rod adjustment is also not changed by clamping of the clamping eccentric 72. Moreover, the clamping pressure is distributed through the flat portion 45 of the structural member 44 by the area over the region of the wiper rod 28, located opoposite to the portion 45.

It will be understood that each of the elements described above, or two or more together, may also find a useful application in other types of constructions differing from the types described above.

While the invention has been illustrated and described as embodied in a wiper arm for transmission moment from drive means to a wiping element for cleaning of a window of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristic of the generic or specific aspects of this invention.

What is claimed as new and desired to be protected by Letters Patent is set forth in the appended claims:

1. A wiper arm for transmitting movement from drive means to a wiping element for wiping a vehicle window, comprising a hub member connectable with drive means; a U-shaped elongated arm body member pivotally connected with said hub member and having two legs connected with one another by a web so as to form a space closed at its three sides; a wiper rod accommodated in said space of said body member and arranged to support a wiping element, said wiper rod being movable in direction of elongation of said body member and fixable relative to the latter; a structural member accommodated in said space and connectable with said wiper rod; a prestressed spring member accommodated in said space and mounted on said hub member and said structural member so as to urge said wiper rod; and a cover member arranged pivotally relative to said body member so as to pivot to a closed position in which said cover member closes said space at its fourth side and arrests said wiper rod.

2. A wiper arm as defined in claim 1, wherein said legs of said body member have free end portions spaced from said web, said cover member being arranged in the region of said free end portions of said legs of said body member.

3. A wiper arm as defined in claim 2, wherein said body member has a portion which is spaced from said hub member, said cover member being pivotally connected with said portion of said body member.

4. A wiper arm as defined in claim 3, wherein said wiper rod is moved and guided over said web ofsaid body member.

5. A wiper arm as defined in claim 1, wherein said cover member is provided with a clamping eccentric which holds said wiper rod when said cover is brought in said closing position.

6. A wiper arm as defined in claim 5, wherein said cover member is U-shaped and has two further legs which are arranged between said legs of said body member.

7. A wiper arm as defined in claim 6; and further comprising a hinge member pivotally mounted said cover member and piercing through said legs of said body member and said further legs of said cover member.

8. A wiper arm as defined in claim 7, wherein said legs of said cover member have rounded edges forming said clamping eccentric, said hinge member being arranged eccentrically to said edges.

9. A wiper arm as defined in claim 8, wherein said web of said body member has an inner side and said wiper rod is guided over said inner side of said web, said structural member arranged to hold said spring member being located between said rounded edges of said legs of said cover member and said wiper rod guided over said inner side of said web.

10. A wiper arm as defined in claim 9, wherein said structural member has a portion located adjacent to said hub member and having a cutout in which said spring member engages.

11. A wiper arm as defined in claim 10, wherein said spring member has an end hook portion which is hung in said cutout of said portion of said structural member.

12. A wiper arm as defined in claim 10, wherein said body member has a recess, said structural member having another portion which is opposite to said first-mentioned portion and provided with a claw engageable in said recess of said body member.

13. A wiper arm as defined in claim 12, said spring member is a tension spring acting in a first direction, said body member having two such recesses which are spaced from one another in said first direction of action of said spring, said claw of said structural member being selectively engageable in one of said recesses.

14. A wiper arm as defined in claim 11, wherein said clawing eccentric is movable between clamping and unclamping positions; and further comprising a rotatable sleeve arranged on said hinge member between said further legs of said structural member, said structural member resting on said rotatable sleeve in said unchanging position of said clamping eccentric.

15. A wiper arm as defined in claim 14; and further comprising a second rotatable sleeve arranged between said hinge member and said cutout for hanging in of said spring member.

16. A wiper arm as defined in claim 1, wherein said cover member in said closing position is releasably arrestable with said body member.

* * * * *